United States Patent [19]

Kawada et al.

[11] Patent Number: 5,699,499
[45] Date of Patent: Dec. 16, 1997

[54] POST-PROCESSOR OF MOTION VECTORS FOR FIELD INTERPOLATION

[75] Inventors: Ryoichi Kawada, Tokyo; Takahiro Hamada, Saitama; Shuichi Matsumoto, Tokyo, all of Japan

[73] Assignee: Kokusai Denshin Denwa Kabushiki Kaisha, Japan

[21] Appl. No.: 498,400

[22] Filed: Jul. 5, 1995

[30] Foreign Application Priority Data

Jul. 25, 1994 [JP] Japan .................... 6-192253

[51] Int. Cl.⁶ .................... G06T 7/00
[52] U.S. Cl. .................... 395/175; 348/699
[58] Field of Search .................... 395/175, 173, 395/174; 348/443, 607, 699, 700; 382/107, 236, 239, 251, 262

[56] References Cited

U.S. PATENT DOCUMENTS

| | | | |
|---|---|---|---|
| 5,148,269 | 9/1992 | de Haan et al. | 348/699 |
| 5,157,732 | 10/1992 | Ishii et al. | 382/107 |
| 5,379,074 | 1/1995 | Hwang | 348/606 |
| 5,428,397 | 6/1995 | Lee et al. | 348/448 |
| 5,473,384 | 12/1995 | Jayant et al. | 348/470 |
| 5,500,904 | 3/1996 | Markandey et al. | 382/103 |
| 5,557,341 | 9/1996 | Weiss et al. | 348/699 |

FOREIGN PATENT DOCUMENTS

| | | |
|---|---|---|
| 0 466 981 | 1/1992 | European Pat. Off. . |
| 0 577 165 | 1/1994 | European Pat. Off. . |

OTHER PUBLICATIONS

"Vector Median Filters", Proceeding of the IEEE, vol. 78, No. 4, Apr. 1990, pp.678–689.

Primary Examiner—Mark K. Zimmerman
Assistant Examiner—Stephen Hong
Attorney, Agent, or Firm—Westman, Champlin & Kelly, P.A.

[57] ABSTRACT

It is sought to provide a motion vector post-processor, which can improve motion vectors of blocks containing boundaries of objects in different movements to provide as visually satisfactory interpolated field quality as possible. Motion vectors generated in a motion estimator are stored in a memory, and their magnitudes are calculated in a magnitude calculator. Magnitude data is fed to an order statistics filter. The filter detects the serial number of a motion vector (for instance third motion vector) less than a magnitude at the center among a plurality of (for instance nine) input motion vectors and outputs corresponding serial number data to the memory. The memory outputs the vector corresponding to the input serial number data to a field interpolator. According to the invention, it is possible to provide a motion vector of an area containing small movement as motion vector of a block containing mixed movements.

6 Claims, 3 Drawing Sheets

POST-PROCESSOR OF MOTION VECTORS FOR FIELD INTERPOLATION

BACKGROUND OF THE INVENTION

1. Field of the Invention

This invention relates to motion vector post-processors and, more particularly, to a motion vector post-processor for post-processing motion vectors of picture field blocks which contain boundaries of objects in different movements in such a manner as to provide for improved interpolated picture quality. The invention is suitably applied to post-processing of motion vector data input to a field interpolator using motion vectors.

2. Description of the Prior Art

General motion pictures including television pictures are in principle provided by successively displaying still pictures at a predetermined frame rate per second, rather than provided as signals which are continuous.

For instance, the broadcast television systems in Japan adopt a frame rate of 30 frames per second, while those in various European countries adopt a frame rate of 25 frames per second. This means that frame rate conversion techniques are important in exchanging broadcast programs between countries which adopt different frame rate television systems.

The principles underlying the frame rate conversion are illustrated in FIG. 5. In the illustrated example, picture frames $(a)_{25}$, $(b)_{25}$, . . . , which are provided at a frame rate of 25 frames per second, are converted to frames $(a)_{30}$, $(b)_{30}$, . . . at a frame rate of 30 frames per second. Assuming that the frames $(a)_{25}$ and $(a)_{30}$ are synchronized, because of the frame rate ratio of 25:30=5:6, the frames of the two systems are synchronized every 6 frames in the latter system.

The original picture frames which are synchronized can be used directly. However, the frames which are not synchronized are produced through interpolation from two adjacent original picture frames. For example, the frame $(b)_{30}$ is produced through interpolation from the adjacent frames $(a)_{25}$ and $(b)_{25}$, and the frame $(c)_{30}$ is produced from the adjacent frames $(b)_{25}$ and $(c)_{25}$. When producing the interpolated frames, i.e., the interpolated fields, it is necessary to compensate motion in original picture.

To produce interpolated fields by compensating motion, there are various ways of motion estimation. In prior art systems, uniformity of motion in picture is assumed, and one picture field is divided into a number of blocks for block-by-block motion estimation. Specifically, inter-field motion between two adjacent fields is detected for each block, and an interpolated field is produced with reference to the two original fields according to a motion vector that is obtained.

Such field interpolation using motion vectors is detailed in, for instance, applicant's patent, i.e., Japanese Patent Publication No. 25119/1993 of an invention entitled "Motion Picture Frame Rate Conversion System Using Motion Amounts".

In the field interpolation system using motion vectors described above, there is a high possibility of failure of correct motion vector production with, for instance, blocks b1, b2, . . . which contain boundaries of objects A and B in different movements as shown in FIG. 3.

SUMMARY OF THE INVENTION

The invention has been made in view of the above problem inherent in the prior art, and its object is to provide a motion vector post-processor, which can improve motion vectors of blocks containing boundaries of objects in different motions to provide for satisfactory visually interpolation field quality.

A feature of the invention resides in a motion vector post-processor for post-processing motion vectors obtained in advance for field interpolation, which comprises means for obtaining the magnitudes of motion vectors of a noted block and blocks adjacent thereto, and means for substituting for the motion vector of the noted block with a motion vector less than a magnitude at the center in the increasing order of magnitudes of the motion vectors.

Another feature of the invention resides in a motion vector post-processor, which comprises means for obtaining the absolute values of magnitudes of the x and y components of motion vectors of a noted block and blocks adjacent thereto, and means for substituting the x and y components of the motion vector of the noted block with the x and y components of a motion vector with absolute values less than magnitudes at the centers in the increasing orders of absolute values of the magnitudes of the motion vectors of the noted block and blocks adjacent thereto.

According to the invention, the magnitudes of motion vectors of a noted block and blocks adjacent thereto or absolute values of magnitudes of the x and y components of motion vectors in advance for field interpolation are obtained. The value of the motion vector of the noted block is substituted with a vector or the x and y components with a magnitude or absolute value less than the center. It is thus provide a motion vector in an area containing small movement as post-processed motion vector of a block containing mixed movements.

DETAILED DESCRIPTION OF THE PREFERRED EMBODIMENTS

The invention will now be described in detail with reference to the drawings. The principles underlying the invention will first be described.

The invention utilizes the character of an individual's sense of sight. The eyes have a character of noting an object in a relatively small movement on a screen when there are a plurality of objects in different movements shown on the screen. For example, when the camera is following a flying ball, (i.e., object A in FIG. 3), the viewer notes the ball, but does not pay substantial attention to the background which is moving quickly (for instance object B in FIG. 3). With blocks b1, b2, . . . containing mixed movements as shown in FIG. 3, the possibility of erroneous motion vector estimation in a motion estimator (see FIGS. 1 and 2) is high compared to the case of blocks in which uniform movements prevail. When utilizing motion vectors for the field interpolation, therefore, it is necessary to compensate the motion vectors of the blocks containing mixed movements by post-processing the obtained motion vectors.

As one method of post-processing, it may be thought to apply the Median filter mentioned above for the x and y components of the obtained motion vector of each block containing mixed movements (for instance block b1) and blocks adjacent to that block. For example, assuming the block b1 to be a noted block, it may be thought to apply the Median filter to the obtained motion vectors of the block b1 and eight blocks adjacent thereto as shown shaded.

Figure 4:
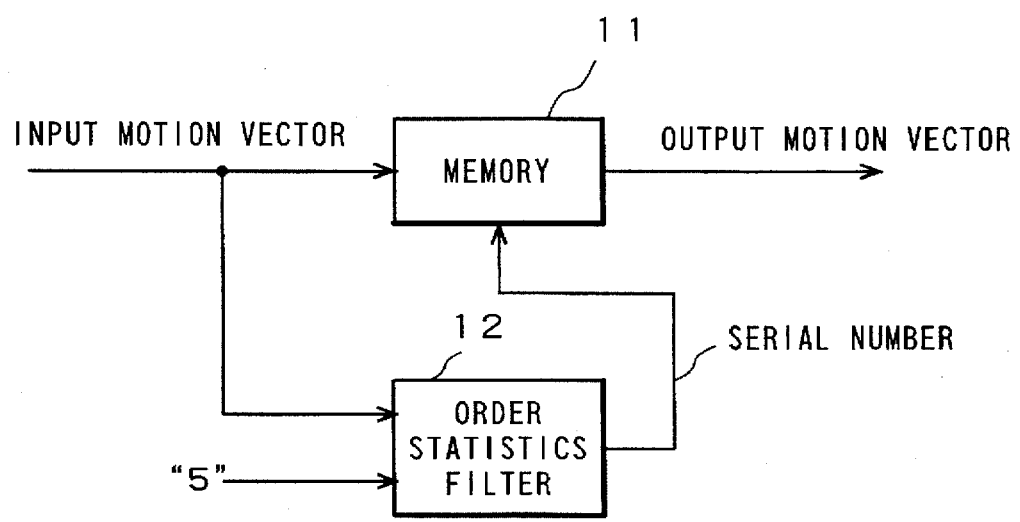
FIG. 4 is a block diagram schematically showing the structure of a Median filter.
Figure 5:
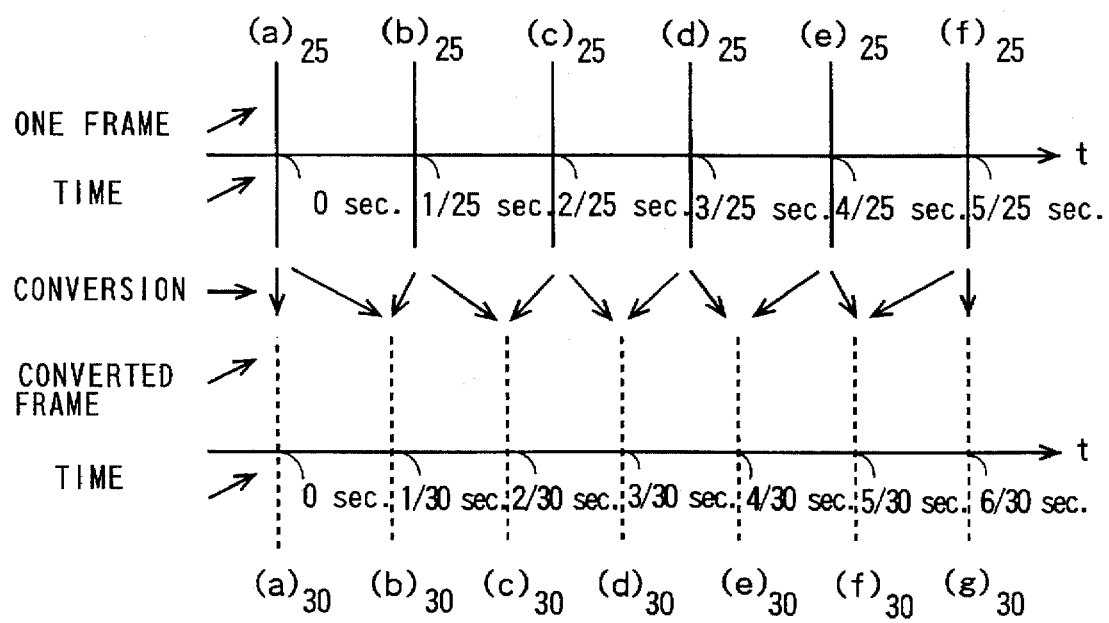
FIG. 5 is a diagram illustrating the principles underlying frame rate conversion.

A summary of the Median filtering is shown in the block diagram of FIG. 4. A plurality of input vectors are stored in a memory 11. An order statistics filter 12 compares the magnitudes of the input vectors, and outputs serial number data of the vector having the center magnitude to the memory 11. When it receives serial number data from the order statistics filter 12, the memory 11 outputs the vector corresponding to the serial number data in substitution for the motion vector of the noted block.

For example, assuming block b1 shown in FIG. 3 as the noted block, the motion vectors of this noted block b1 and eight blocks adjacent thereto, that is, a total of nine blocks, are input as input vectors to the memory 11 and order statistics filter 12. The memory 11 stores the input vectors, while the order statistics filter 12 detects the serial number, i.e., the number corresponding to the vector's position in the series, of the center, i.e., median, magnitude vector (the fifth magnitude vector) among the nine vectors and outputs this serial number data to the memory 11. Assuming, for instance, a case the nine motion vectors which are input successively to the order statistics filter 12 are of magnitudes of −4, −4, −4, −5, 3, 1, 2, 2, and 2, respectively, rearranging this series of motion vectors in the order of smaller magnitudes results in a magnitude series of −5, −4, −4, −4, 1, 2, 2, 2, and 3. Thus, the center magnitude vector is of magnitude 1, and the order statistics filter 12 outputs serial number data of "6". When this number "6" is supplied, the memory 11 outputs the sixth input vector as output motion vector.

In the above description, the signals input to the memory 11 and order statistics filter 12 are assumed to represent vectors for the sake of simplicity of description, actually they represent the x and y components of the input vectors, that is, the Median filtering process is executed on the x and y components of the input vectors.

The Median filtering has been developed to deal with pixel values for such a purpose as picture noise removal. More specifically, in this process pixel values which are greatly different from those of the pixels adjacent to the noted one, i.e., pixel values which are likely the result of noise, are substituted for with the center value among the adjacent pixel values, thus effecting the noise removal.

In the case of pixel values, substitution with the center value permits satisfactory noise removal results to be obtained. Where motion vectors are dealt with, however, there is no guarantee that mere substitution for the noted block motion vector with the center value of motion vectors of a plurality of blocks, i.e., the noted blocks and blocks adjacent thereto, provides for visually satisfactory quality of the noted block in the interpolated field.

In other words, in this method, merely the vector with the center magnitude is taken as described above, and no consideration is given to the fact that the viewer's attention is attracted to a slowly moving object. It is well known that the slower the movement that an object deteriorates in interpolated fields recognized as the greater deterioration by the viewer. With the pure Median filter, the possibility of deterioration of objects which are in slow movements and readily notable is increased.

When substituting for the motion vector of a block containing mixed movements, in other words, with either of the motion vectors of objects containing mixed movements (i.e., the ball and background in the above example), either object is deteriorated in that block in the interpolated field. That is, the boundary image of either the ball or the background is deteriorated.

According to the invention, it is sought to let the deteriorated block become as minimally notable to the viewer as possible. Specifically, it is a principle underlying the invention to provide motion vectors of comparatively small magnitudes to pertinent blocks, thereby suppressing deterioration of objects in slow movements and make deterioration of interpolated picture as less notable as possible.

Figure 1:
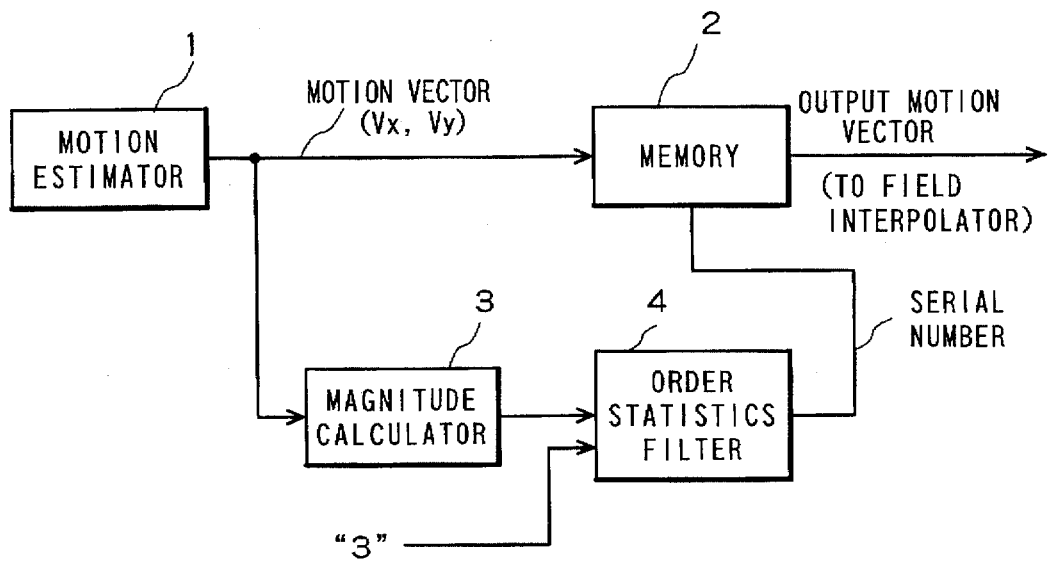
FIG. 1 is a block diagram schematically showing the structure of an embodiment of the invention.

An embodiment of the invention will now be described with reference to FIG. 1. Referring to FIG. 1, a motion estimator 1 generates motion vectors of picture. A memory 2 stores the motion vectors which are successively output from the motion estimator 1, that is, obtained motion vectors in advance for field interpolation. A magnitude calculator 3 calculates the magnitudes of the motion vectors output from the motion estimator 1. An order statistics filter 4 extracts, for instance, the third one of nine vectors and outputs serial number data of that vector. The memory 2, magnitude calculator 3 and order statistics filter 4 together constitute a motion vector post-processor. Here, representing the x and y components of motion vectors as (Vx, Vy), the magnitude calculator 3 calculates $(Vx^2+Vy^2)^{1/2}$. The operation of the embodiment will now be described.

The motion estimator 1 successively outputs motion vectors (Vx, Vy) (for instance a total of nine motion vectors) of a noted block and blocks adjacent thereto. The output motion vectors (Vx, Vy) are successively stored in the memory 2, while they are also successively input into the magnitude calculator 3. The magnitude calculator 3 calculates the magnitudes of the input motion vectors in the operation mentioned above and provides magnitude data to the order statistics filter 4. The order statistics filter 4 determines the serial number of a motion vector, which has a magnitude at the center or below, for instance the third smallest magnitude, in the increasing order of magnitudes of the motion vectors output from the motion estimator 1, and outputs serial number data thus obtained to the memory 2. The memory 2 outputs a motion vector of the serial number as specified by the order statistics filter 4.

As has been shown, a motion vector having, for instance, the third greater magnitude among the nine vectors, i.e., a vector of a block involving a comparatively slow movement, is selected to be a motion vector of a block containing mixed movements. It is thus possible to prevent deterioration of the visual quality of interpolated picture.

Figure 2:
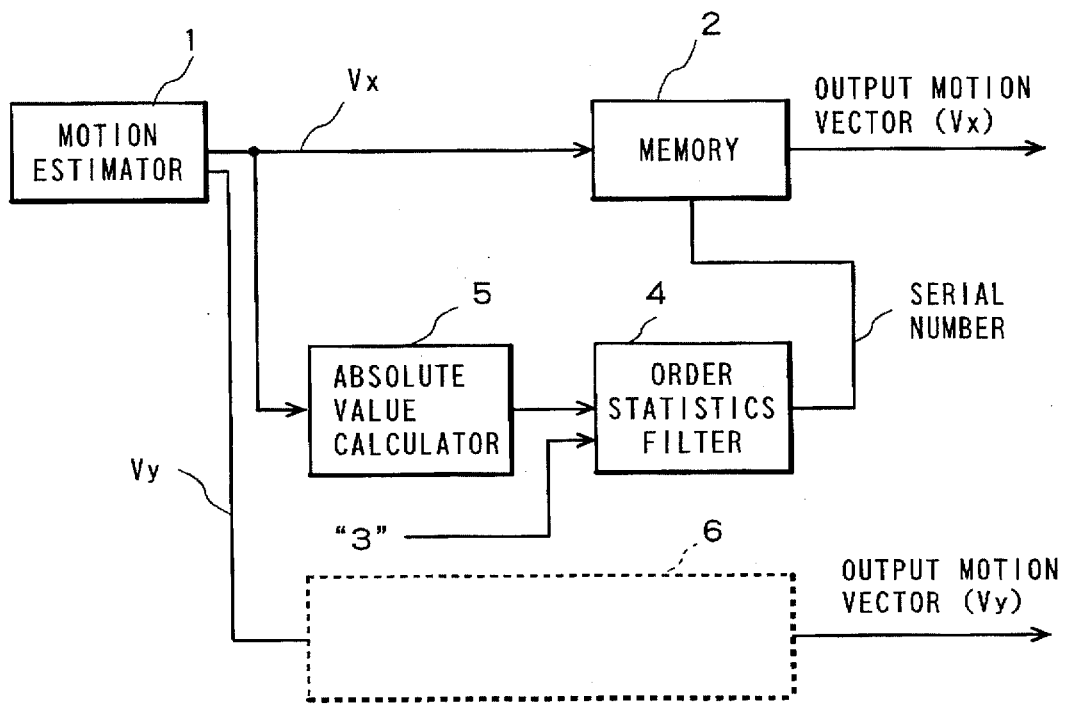
FIG. 2 is a block diagram schematically showing the structure of a second embodiment of the invention.
Figure 3:
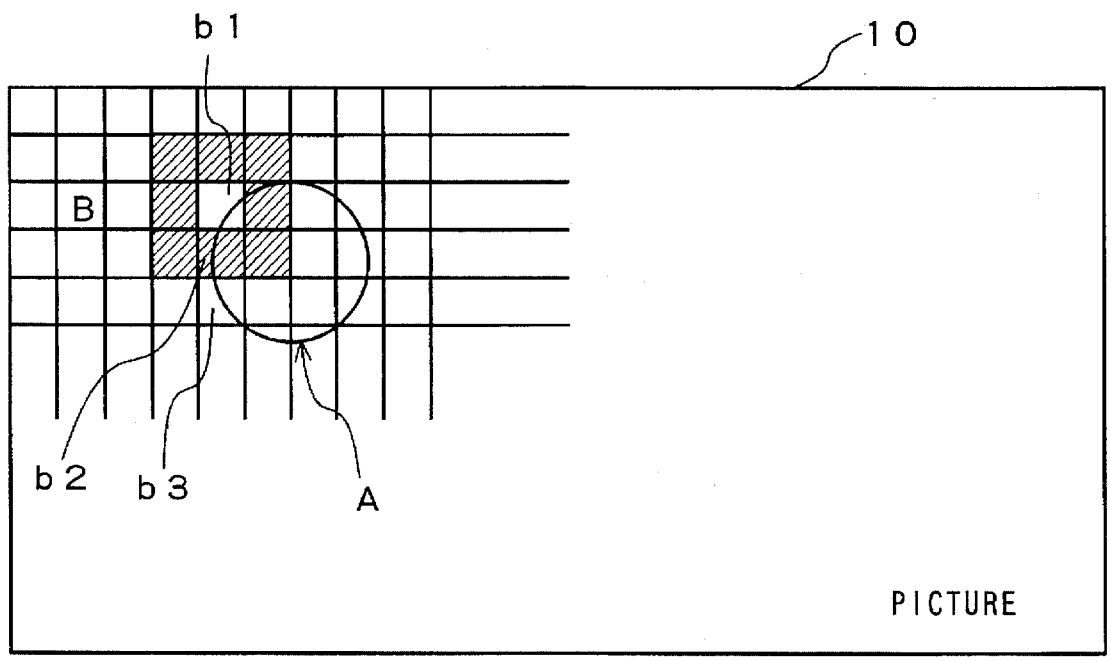
FIG. 3 is a view showing blocks containing and not containing mixed movements.

FIG. 2 is a block diagram showing a second embodiment of the invention. Referring to the Figure, designated at number 5 is an absolute value calculator. Item at numeral 6 represents a motion vector post-processor of the y component having the same construction as said motion vector post-processor of the x component, which comprises memory 2, order statistics filter 4, and absolute value calculator 5.

In this embodiment, the motion estimator 1 outputs the x and y components of motion vectors (for instance a total of nine motion vectors) of a noted block and blocks adjacent thereto. The x and y components of the motion vectors are input to the first and second motion vector post-processor. In the first and second motion vector post-processors, the x and y components are stored in the memory 2, and the absolute values x and y are obtained in the absolute value calculator 5. The order statistics filter 4 specifies, as in the previous first embodiment, the serial number of the vector with the third smallest magnitude, and outputs serial number data thus obtained to the memory 2. The memory 2, in each of the first and second motion vector post-processors, outputs the vector of the serial number specified by the order statistics filter 4 as each of output motion vectors Vx and Vy.

Again in this embodiment, like the first embodiment, it is possible to prevent deterioration of the visual quality of interpolated picture as much as possible.

In the embodiments described above, the motion vectors of all the picture field blocks are post-processed. However, with a noted block not containing mixed movements, the motion vector of the noted block and those of the adjacent blocks have substantially the same magnitude. Thus, the motion vector of the noted block may be substituted for without any adverse effect with a vector with a magnitude at the center or below in the increasing order of magnitudes.

As has been described in the foregoing, according to the invention a motion vector of an area involving a small movement may be provided as motion vector of a block containing mixed movements. It is thus possible to readily prevent deterioration of the visual quality of interpolated fields produced by inappropriate motion compensation.

What is claimed is:

1. A motion vector post-processor for post-processing motion vectors obtained in advance for field interpolation, comprising:

a motion estimator for obtaining motion vectors in advance for field interpolation;

means for obtaining magnitudes of motion vectors of a noted block and a plurality of blocks adjacent thereto; and means for substituting for the motion vector of the noted block with a motion vector less than a magnitude at the center in the increasing order of the obtained magnitudes.

2. The motion vector post-processor according to claim 1, wherein:

the noted block contains mixed movements, and the motion vector of the noted block is substituted for with a motion vector less than a magnitude at the center in the increasing order of magnitudes of the motion vectors.

3. A motion vector post-processor, in which the motion vector post-processor according to claim 1 is used when generating interpolated picture.

4. A motion vector post-processor for post-processing motion vectors obtained in advance for field interpolation, comprising:

a motion estimator for obtaining motion vectors in advance for field interpolation;

means for obtaining absolute values of the x and y components of motion vectors of a noted block and a plurality of blocks adjacent thereto; and means for substituting for the x and y components of the motion vector of the noted block with the x and y components of a motion vector with absolute values less than magnitudes at the centers in the increasing order of absolute values of magnitudes of the motion vectors.

5. The motion vector post-processing according to claim 4, wherein:

the noted block contains mixed movements, and the x and y components of the motion vector of the noted block are substituted for with the x and y components of a motion vector less than magnitudes at the center in the increasing orders of magnitudes of the motion vectors of the noted block and blocks adjacent thereto.

6. A motion vector post-processor, in which the motion vector post-processor according to claim 4 is used when generating interpolated image.

* * * * *